US009902067B2

United States Patent
Inoue (10) Patent No.: US 9,902,067 B2
(45) Date of Patent: Feb. 27, 2018

(54) OFFLINE ROBOT PROGRAMMING DEVICE (71) Applicant: FANUC CORPORATION, Yamanashi (JP)

(72) Inventor: Kozo Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/292,132

(22) Filed: Oct. 13, 2016

(65) Prior Publication Data
US 2017/0120447 A1 May 4, 2017

(30) Foreign Application Priority Data

Nov. 2, 2015 (JP) .................................. 2015-215572

(51) Int. Cl.
*B25J 9/16* (2006.01)
(52) U.S. Cl.
CPC ........... *B25J 9/1666* (2013.01); *B25J 9/1671* (2013.01); *G05B 2219/40476* (2013.01)
(58) Field of Classification Search
CPC ...... B25J 9/1666; B25J 9/1671; B25J 9/1687; B25J 9/1697; G05B 2219/40476
See application file for complete search history.

(56) References Cited

U.S. PATENT DOCUMENTS

| 5,231,693 | A | * | 7/1993 | Backes | .................. | B25J 9/1661 |
| | | | | | | 318/568.1 |
| 2004/0189631 | A1 | * | 9/2004 | Kazi | ...................... | B25J 9/1671 |
| | | | | | | 345/418 |
| 2005/0224479 | A1 | | 10/2005 | Watanabe et al. | | |
| 2009/0142740 | A1 | * | 6/2009 | Liang | ...................... | G06T 19/00 |
| | | | | | | 434/262 |
| 2012/0290130 | A1 | * | 11/2012 | Kapoor | .................. | B25J 9/1671 |
| | | | | | | 700/247 |
| 2014/0214394 | A1 | * | 7/2014 | Inoue | .................. | G06F 17/5009 |
| | | | | | | 703/13 |

FOREIGN PATENT DOCUMENTS

| CN | 1680079 A | 10/2005 |
| CN | 104361162 A | 2/2015 |
| JP | 04-096806 A | 3/1992 |
| JP | 11-058276 A | 3/1999 |

(Continued)

*Primary Examiner* — Stephen Holwerda
(74) *Attorney, Agent, or Firm* — Hauptman Ham, LLP (57) ABSTRACT

A robot programming device capable of easily checking interference between a robot and peripheral equipment, by which the interference can be easily avoided automatically or manually. The programming device has: a simulation executing part which executes a simulation of motions of peripheral equipment and a robot hand based on a control signal; a signal setting part which sets the control signal for executing the simulation, with respect to a teaching point or a trajectory between the teaching points included in a predetermined robot operation program or a program template, the control signal being set as attribute data of each teaching point or each trajectory; a moving part which moves the robot to the teaching point or the trajectory; and a display setting part which determines as to whether the workpiece is displayed or hidden, with respect to the teaching point or the trajectory to which the robot is moved.

3 Claims, 4 Drawing Sheets

(56) References Cited

FOREIGN PATENT DOCUMENTS

| JP | 3905075 B2 | 4/2007 |
| JP | 2007-193846 A | 8/2007 |
| JP | 5058063 B2 | 10/2012 |
| JP | 2013-99815 A | 5/2013 |
| JP | 2014-144523 A | 8/2014 |

* cited by examiner

OFFLINE ROBOT PROGRAMMING DEVICE

RELATED APPLICATIONS

The present application claims priority to Japanese Patent Application Number 2015-215572 filed Nov. 2, 2015, the disclosure of which is hereby incorporated by reference herein in its entirety.

BACKGROUND OF THE INVENTION

1. Field of the Invention

The preset invention relates to a robot programming device for carrying out a simulation of a robot, and for generating or correcting an operation program of the robot offline.

2. Description of the Related Art

In a system including a robot and peripheral equipment such as a machine tool, a cooperative operation is often carried out, in which a workpiece held by the robot is moved and positioned in the machine tool, and the workpiece is processed by the machine tool. Such a system can be controlled by a given motion program, whereas it is necessary to appropriately modify the motion program when the type of the robot, the machine tool or the workpiece is changed.

As a related art document, JP 3905075 B discloses an operation program generating device, in which an operation program is divided into a first program required to be modified depending on a workpiece and a second program which does not depend on the type of the workpiece, and the operation program corresponding to a new workpiece can be generated by modifying the first program only.

Further, JP 5058063 B discloses a development support device for a control system, configured to combine program units (or program blocks) for executing respective operations so as to generate a control program for the control system which carries out a plurality of operations.

On the other hand, it is a well-known technique that offline simulation is executed based on a generated motion program, in order to evaluate effectiveness, etc., of the motion program. For example, JP 2013-099815 A discloses a robot programming device configured to display three-dimensional models of a robot, a workpiece and peripheral equipment. When interference may occur between each teaching point of a motion program, the robot programming device can automatically correct the position of the teaching point so as to prevent the interference.

Further, JP 2014-144523 A discloses a motion program generating device, in which an execution switch is positioned and displayed with respect to each of a plurality of blocks or operation units of a motion program, and each block can be executed by operating the execution switch so as to check the motion.

When the peripheral equipment is shifted or the robot hand or the workpiece is moved when the robot is operated, an interference area between the robot and the peripheral equipment is changed. When it is necessary to correct or generate a teaching point in the offline robot program, it is also necessary to correct the teaching point by moving the robot after the peripheral equipment is shifted, and such correction is burdensome.

Also, when a system layout (such as the size and/or the position of the peripheral equipment) is changed, the interference area is changed. Therefore, it is necessary to carry out interference check with respect to each teaching point, and manually operate the robot so as to correct the teaching point or add another teaching point. Further, when the interference may occur on a path between the teaching points, it is necessary to manually operate the robot so as to correct the teaching point or add another teaching point.

SUMMARY OF THE INVENTION

Therefore, an object of the present invention is to provide a robot programming device capable of easily checking interference between a robot and peripheral equipment, by which the interference can be easily avoided automatically or manually by an operator.

According to the present invention, there is provided a robot programming device for locating a robot, peripheral equipment and a workpiece in a three-dimensional virtual space, and for teaching the robot, the robot programming device comprising: a simulation executing part which executes a simulation of a motion of the peripheral equipment and an opening/closing motion of a hand of the robot, by using a control signal; a signal setting part which sets the control signal for executing the simulation of the motion of the peripheral equipment and the opening/closing motion of the hand of the robot, with respect to a teaching point or a trajectory between the teaching points included in a predetermined robot operation program, or with respect to a teaching point or a trajectory between the teaching points included in a program template on which the robot operation program is described, the control signal being set as attribute data of each teaching point or each trajectory; a moving part which moves the robot to the teaching point or the trajectory between the teaching points; and a display setting part which determines as to whether the workpiece is displayed or hidden, with respect to the teaching point or the trajectory between the teaching points to which the robot is moved.

In a preferred embodiment, the robot programming device further comprises: an interference avoidance condition setting part which sets a motion direction and a motion range of the robot for searching a position for avoiding interference, the motion direction and the motion range of the robot being set as attribute data to the teaching point; and an interference avoidance teaching point setting part which, when interference occurs with respect to the robot moved to the teaching point by the moving part, moves the robot to a position where the interference can be avoided based on the setting of the interference avoidance condition setting part, and then automatically sets the position where the interference can be avoided as a teaching point.

In another preferred embodiment, the robot programming device further comprises: an interference avoidance condition setting part which sets a motion direction and a motion range of the robot for searching a position for avoiding interference, the motion direction and the motion range of the robot being set as attribute data to the trajectory between the teaching points; and an interference avoidance teaching point setting part which, when an interference section with respect to the robot exists on the trajectory between the teaching points to which the robot is moved by the moving part, moves both ends of the interference section based on the setting of the interference avoidance condition setting part, and then automatically sets positions of the moved ends of the interference section as teaching points.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
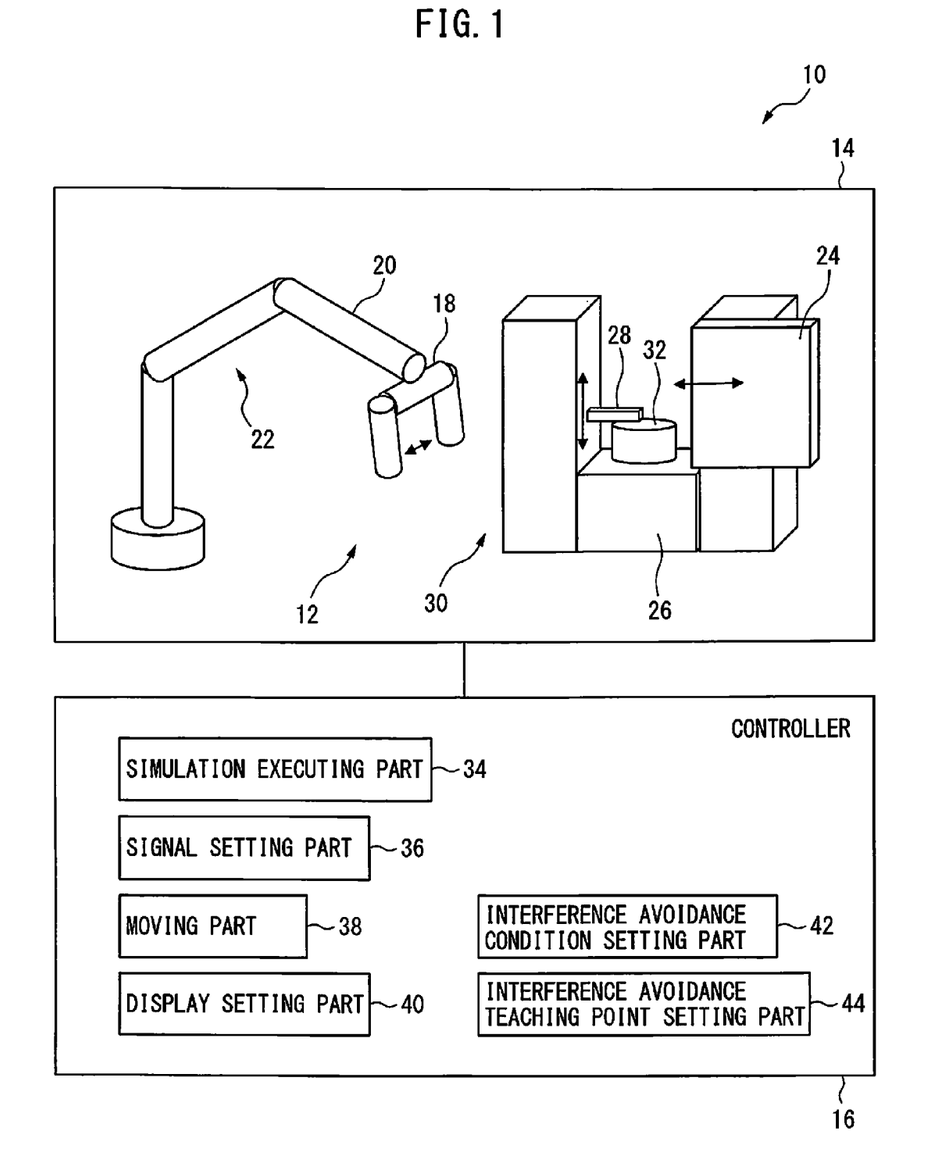
FIG. 1 shows a structural example of a robot programming device according to a preferred embodiment of the present invention.

FIG. 1 is a view showing a structural example of an offline robot programming device (hereinafter, also referred to as merely the "programming device") 10 according to a preferred embodiment of the present invention. Programming device 10 includes a indicating part (display) 14 capable of displaying a three-dimensional model of a robot system 12 located within a three-dimensional virtual space, and a controller 16 having functions as explained below. Robot system 12 includes a robot 22 having a movable part (robot arm) 20 provided with an openable hand 18, and peripheral equipment (for example, a machine tool) 30 having an openable door 24, a working table 26 and an openable clamper 28. Hand 18, door 24 and clamper 28 are controlled by an I/O signal (control signal) of robot 22.

Hand 18 is configured to: grip a workpiece 32 to be processed by machine tool 30; enter machine tool 30 while gripping workpiece 32 when door 24 is opened; locate workpiece 32 onto working table 26 of machine tool 30; and exit from machine tool 30 after locating workpiece 32. On the other hand, clamper 28 is configured to hold workpiece 32 on working table 26 located by robot 22, whereby machine tool 30 can carry out a predetermined process for workpiece 32 held by clamper 28.

Controller 16 includes: a simulation executing part 34 which executes a simulation of a motion of peripheral equipment 30 and an opening/closing motion of hand 18, based on the control signal; a signal setting part 36 which sets the control signal for executing the simulation of the motion of peripheral equipment 30 and the opening/closing motion of hand 18, with respect to a teaching point or a trajectory between the teaching points included in a predetermined robot operation program, or with respect to a teaching point or a trajectory between the teaching points included in a program template on which the robot operation program is previously described, the control signal being set as attribute data of each teaching point or each trajectory; a moving part (movement commanding part) 38 which moves robot 22 to the teaching point or the trajectory between the teaching points; and a display setting part 40 which determines as to whether workpiece 32 is to be displayed or hidden, with respect to the teaching point or the trajectory between the teaching points to which robot 22 is moved.

Optionally, controller 16 may include: an interference avoidance condition setting part 42 which sets a motion direction and a motion range of robot 22 for searching a position for avoiding interference, the motion direction and the motion range of robot 22 being set as attribute data to the teaching point; and an interference avoidance teaching point setting part 44 which, when interference occurs with respect to robot 22 moved to the teaching point by moving part 38, moves robot 22 to a position where the interference can be avoided based on the setting of interference avoidance condition setting part 42, and then automatically sets the position where the interference can be avoided as a teaching point.

Alternatively, controller 16 may include: an interference avoidance condition setting part 42 which sets a motion direction and a motion range of robot 22 for searching a position for avoiding interference, the motion direction and the motion range of the robot being set as attribute data to the trajectory between the teaching points; and an interference avoidance teaching point setting part 44 which, when an interference section (a section C0 to C1 as explained below) with respect to robot 22 exists on the trajectory between the teaching points to which robot 22 is moved by moving part 38, moves both ends of the interference section based on the setting of interference avoidance condition setting part 42, and then automatically sets positions of the moved ends of the interference section as teaching points.

Figure 2:
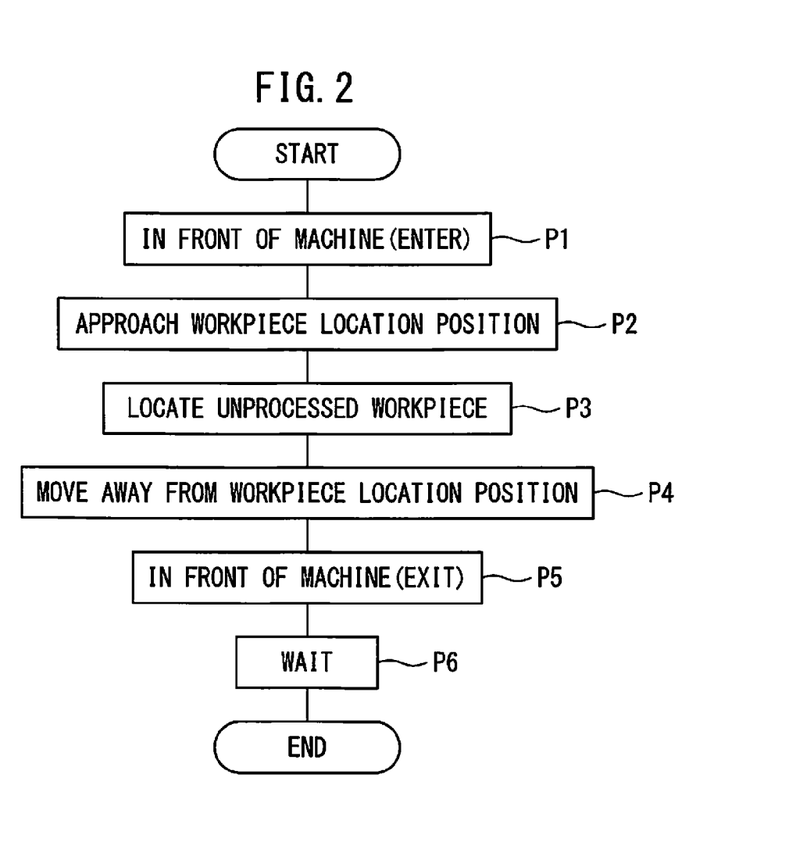
FIG. 2 is a flowchart showing an example of an operation flow of a robot when the robot conveys a workpiece into a machine tool.
Figure 3:
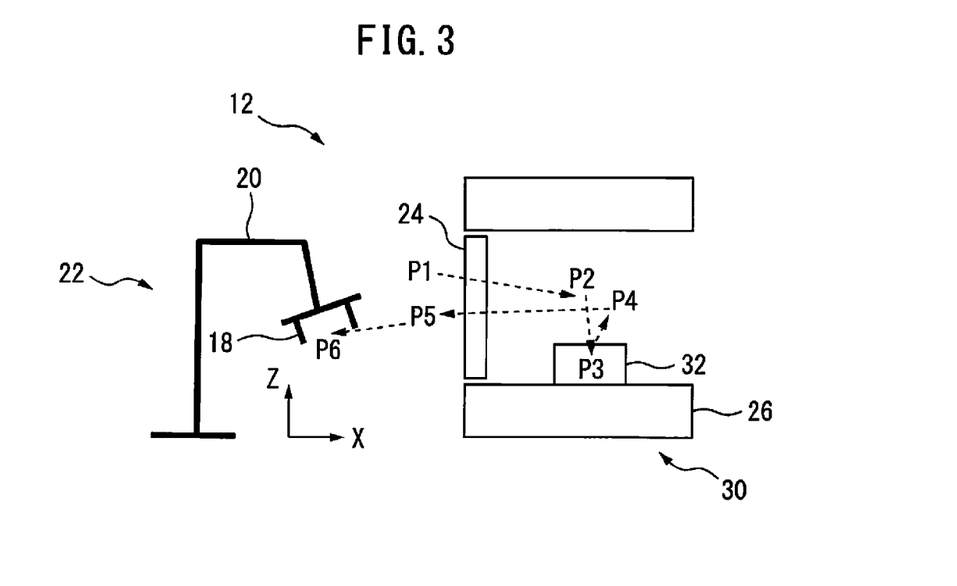
FIG. 3 shows a structural example of a robot system to which the robot programming device of FIG. 1 can be applied.

Hereinafter, an example of the procedure of programming device 10 will be explained. In this example, as shown in FIGS. 2 and 3, a predetermined robot operation program for executing a series of operations, or a program template on which the operation program is described, is previously prepared (for example, stored in a suitable memory). in the series of operation, hand 18 gripping unprocessed workpiece 32 moves to in front of machine tool 30 (P1); hand 18 enters machine tool 30 and approaches a workpiece location position after door 24 is opened (P2); hand 18 locates workpiece 32 onto working table 26 (P3); hand 18 moves away from the workpiece location position after workpiece 32 is held by closed clamper 28 (P4); hand 18 moves (exits) to in front of (outside) machine tool 30 (P5); and hand 18 moves to a predetermined waiting position (P6).

Table 1 shows attribute data of each of teaching point P1 to P6. In detail, the attribute data of each teaching point includes: a control signal DO[1] for opening/closing door 24; a control signal RO[1] for opening/closing hand 18; a control signal DO[2] for opening/closing clamper 28; a signal "gripped workpiece" for setting as to whether the workpiece gripped by hand 18 is displayed or hidden (undisplayed); and a signal "located workpiece" for setting as to whether the workpiece located on working table 26 is displayed or hidden (undisplayed).

By setting the signals as indicated by table 1, the following processes can be automatically executed: until workpiece 32 is located on working table 26 (from P1 to P3), the gripped workpiece is displayed and the located workpiece is hidden; and from when hand 18 is moved away from the workpiece location position to when hand 18 is returned to the waiting position (from P4 to P6), the gripped workpiece is hidden and the located workpiece is displayed. In other words, when robot 22 (hand 18) is moved to any teaching point, the virtual workpiece can be automatically displayed or hidden depending on the actual motion. Therefore, the operator can easily and correctly check the interference between robot 22 and machine tool 30, etc. at each teaching point, and thus can easily correct the teaching point or add a new teaching point when the interference may occur.

TABLE 1

Attribute Data of Teaching Point

| Name of Teaching Point | Name of Signal | Value (Signal Setting) | Content |
|---|---|---|---|
| In Front of Machine (Enter) (P1) | DO[1] | ON | Close Door |
| | RO[1] | ON | Close Hand |
| | DO[2] | OFF | Open Clamper |
| | Gripped Workpiece | Display | Display Gripped Workpiece |
| | Located Workpiece | Hide | Hide Located Workpiece |
| Approach Workpiece Location Position (P2) | DO[1] | OFF | Open Door |
| | RO[1] | ON | Close Hand |
| | DO[2] | OFF | Open Clamper |
| | Gripped Workpiece | Display | Display Gripped Workpiece |
| | Located Workpiece | Hide | Hide Located Workpiece |
| Locate Unprocessed Workpiece (P3) | DO[1] | OFF | Open Door |
| | RO[1] | ON | Close Hand |
| | DO[2] | OFF | Open Clamper |
| | Gripped Workpiece | Display | Display Gripped Workpiece |
| | Located Workpiece | Hide | Hide Located Workpiece |
| Exit From Workpiece Location Position (P4) | DO[1] | OFF | Open Door |
| | RO[1] | OFF | Open Hand |
| | DO[2] | ON | Close Clamper |
| | Gripped Workpiece | Hide | Hide Gripped Workpiece |
| | Located Workpiece | Display | Display Located Workpiece |
| In Front of Machine (Exit) (P5) | DO[1] | ON | Close Door |
| | RO[1] | OFF | Open Hand |
| | DO[2] | ON | Close Clamper |
| | Gripped Workpiece | Hide | Hide Gripped Workpiece |
| | Located Workpiece | Display | Display Located Workpiece |
| Wait (P6) | DO[1] | ON | Close Door |
| | RO[1] | OFF | Open Hand |
| | DO[2] | ON | Close Clamper |
| | Gripped Workpiece | Hide | Hide Gripped Workpiece |
| | Located Workpiece | Display | Display Located Workpiece |

Table 2 shows attribute data of each trajectory between teaching points P1 to P6. In detail, similarly to table 1, the attribute data of each trajectory includes: a control signal DO[1] for opening/closing door 24; a control signal RO[1] for opening/closing hand 18; a control signal DO[2] for opening/closing clamper 28; a signal "gripped workpiece" for setting as to whether the workpiece gripped by hand 18 is displayed or hidden; and a signal "located workpiece" for setting as to whether the workpiece located on working table 26 is displayed or hidden.

By setting the signals as indicated by table 2, the following processes can be automatically executed: until workpiece 32 is located on working table 26 (from P1 to P3), the gripped workpiece is displayed and the located workpiece is hidden; and from when hand 18 is moved away from the workpiece location position to when hand 18 is returned to the waiting position (from P4 to P6), the gripped workpiece is hidden and the located workpiece is displayed. In other words, when robot 22 (hand 18) is moved to any teaching point, the virtual workpiece can be automatically displayed or hidden depending on the actual motion. Therefore, the operator can easily and correctly monitor the interference between robot 22 and machine tool 30, etc. at each teaching point, and thus can easily correct the teaching point or add a new teaching point when the interference may occur.

TABLE 2

Attribute Data between Teaching Points

| Name of Trajectory between Teaching Points | Name of Signal | Value (Signal Setting) | Content |
|---|---|---|---|
| From (In Front of Machine (Enter)) to (Approach Workpiece Location Position) | DO[1] | OFF | Open Door |
| | RO[1] | ON | Close Hand |
| | DO[2] | OFF | Open Clamper |
| | Gripped Workpiece | Display | Display Gripped Workpiece |
| | Located Workpiece | Hide | Hide Located Workpiece |
| From (Approach Workpiece Location Position) to (Locate Unprocessed Workpiece) | DO[1] | OFF | Open Door |
| | RO[1] | ON | Close Hand |
| | DO[2] | OFF | Open Clamper |
| | Gripped Workpiece | Display | Display Gripped Workpiece |
| | Located Workpiece | Hide | Hide Located Workpiece |
| From (Locate Unprocessed Workpiece) to (Exit From Workpiece Location Position) | DO[1] | OFF | Open Door |
| | RO[1] | OFF | Open Hand |
| | DO[2] | ON | Close Clamper |
| | Gripped Workpiece | Hide | Hide Gripped Workpiece |
| | Located Workpiece | Display | Display Located Workpiece |
| From (Exit From Workpiece Location Position) to (In Front of Machine (Exit)) | DO[1] | OFF | Open Door |
| | RO[1] | OFF | Open Hand |
| | DO[2] | ON | Close Clamper |
| | Gripped Workpiece | Hide | Hide Gripped Workpiece |
| | Located Workpiece | Display | Display Located Workpiece |
| From (In Front of Machine (Exit)) to (Wait) | DO[1] | ON | Close Door |
| | RO[1] | OFF | Open Hand |
| | DO[2] | ON | Close Clamper |
| | Gripped Workpiece | Hide | Hide Gripped Workpiece |
| | Located Workpiece | Display | Display Located Workpiece |

Table 3 shows attribute data relating to a process for automatically correcting or adding a teaching point in order to avoid the interference, by using interference avoidance condition setting part 42 and interference avoidance teaching point setting part 44 as explained above. In a non-limiting example, search axes for moving robot 22 (hand 18) so as to avoid the interference are determined as three axes (X, Y and Z), and as shown in FIG. 3, the X-axis corresponds to the horizontal direction from robot 22 toward machine tool 30, the Z-axis corresponds to the vertical direction, and the Y-axis is perpendicular to both the X- and Z-axes.

TABLE 3

Attribute Data of Teaching Point (for Avoiding Interference)

| Name of Teaching Point | Search Axis | Search Direction | Motion Range (±) |
|---|---|---|---|
| In Front of Machine (Enter) (P1) | X | From − to + | 1000 |
| | Z | From + to − | 1000 |
| | Y | From + to − | 1000 |
| Approach Workpiece Location Position (P2) | Z | From + to − | 1000 |
| | X | From − to + | 1000 |
| | Y | From + to − | 1000 |
| Locate Unprocessed Workpiece (P3) | Z | From + to − | 1000 |
| | X | From − to + | 1000 |
| | Y | From + to − | 1000 |
| Exit From Workpiece Location | Z | From + to − | 1000 |
| | X | From − to + | 1000 |
| | Y | From + to − | 1000 |

TABLE 3-continued

Attribute Data of Teaching Point (for Avoiding Interference)

| Name of Teaching Point | Search Axis | Search Direction | Motion Range (±) |
|---|---|---|---|
| Position (P4) In Front of Machine (Exit) (P5) | X | From − to + | 1000 |
| | Z | From + to − | 1000 |
| | Y | From + to − | 1000 |
| Wait (P6) | X | From − to + | 1000 |
| | Z | From + to − | 1000 |
| | Y | From + to − | 1000 |

When the interference occurs at the teaching point to which robot 22 is moved due to the operation by the operator, as indicated by table 3, at least one search axis at the teaching point is moved along a search direction thereof within a predetermined motion range (or a search range), whereby the teaching point can be automatically corrected so as to avoid the interference. In the example of table 3, although the motion range of each search axis is determined as ±1000 mm, this range may be determined or modified based on the shape or size of robot 22, machine tool 30 or workpiece 32, etc.

Table 4 shows attribute data relating to a process for automatically correcting or adding a trajectory between teaching points in order to avoid the interference, by using interference avoidance condition setting part 42 and interference avoidance teaching point setting part 44 as explained above. In a non-limiting example of table 4, similarly to table 3, search axes for moving robot 22 (hand 18) so as to avoid the interference are determined as three axes (X, Y and Z), and as shown in FIG. 3, the X-axis corresponds to the horizontal direction from robot 22 toward machine tool 30, the Z-axis corresponds to the vertical direction, and the Y-axis is perpendicular to both the X- and Z-axes.

TABLE 4

Attribute Data between Teaching Points (for Avoiding Interference)

| Name of Trajectory between Teaching Points | Search Axis | Search Direction | Motion Range (±) |
|---|---|---|---|
| From (In Front of Machine (Enter)) to (Approach Workpiece Location Position) | X | From − to + | 1000 |
| | Z | From + to − | 1000 |
| | Y | From + to − | 1000 |
| From (Approach Workpiece Location Position) to (Locate Unprocessed Workpiece) | X | From − to + | 1000 |
| | Z | From + to − | 1000 |
| | Y | From + to − | 1000 |
| From (Locate Unprocessed Workpiece) to (Exit From Workpiece Location Position) | X | From − to + | 1000 |
| | Z | From + to − | 1000 |
| | Y | From + to − | 1000 |
| From (Exit From Workpiece Location | X | From − to + | 1000 |
| | Z | From + to − | 1000 |
| | Y | From + to − | 1000 |
| Position) to (In Front of Machine (Exit)) From (In Front of Machine (Exit)) to (Wait) | X | From − to + | 1000 |
| | Z | From + to − | 1000 |
| | Y | From + to − | 1000 |

Figure 4:
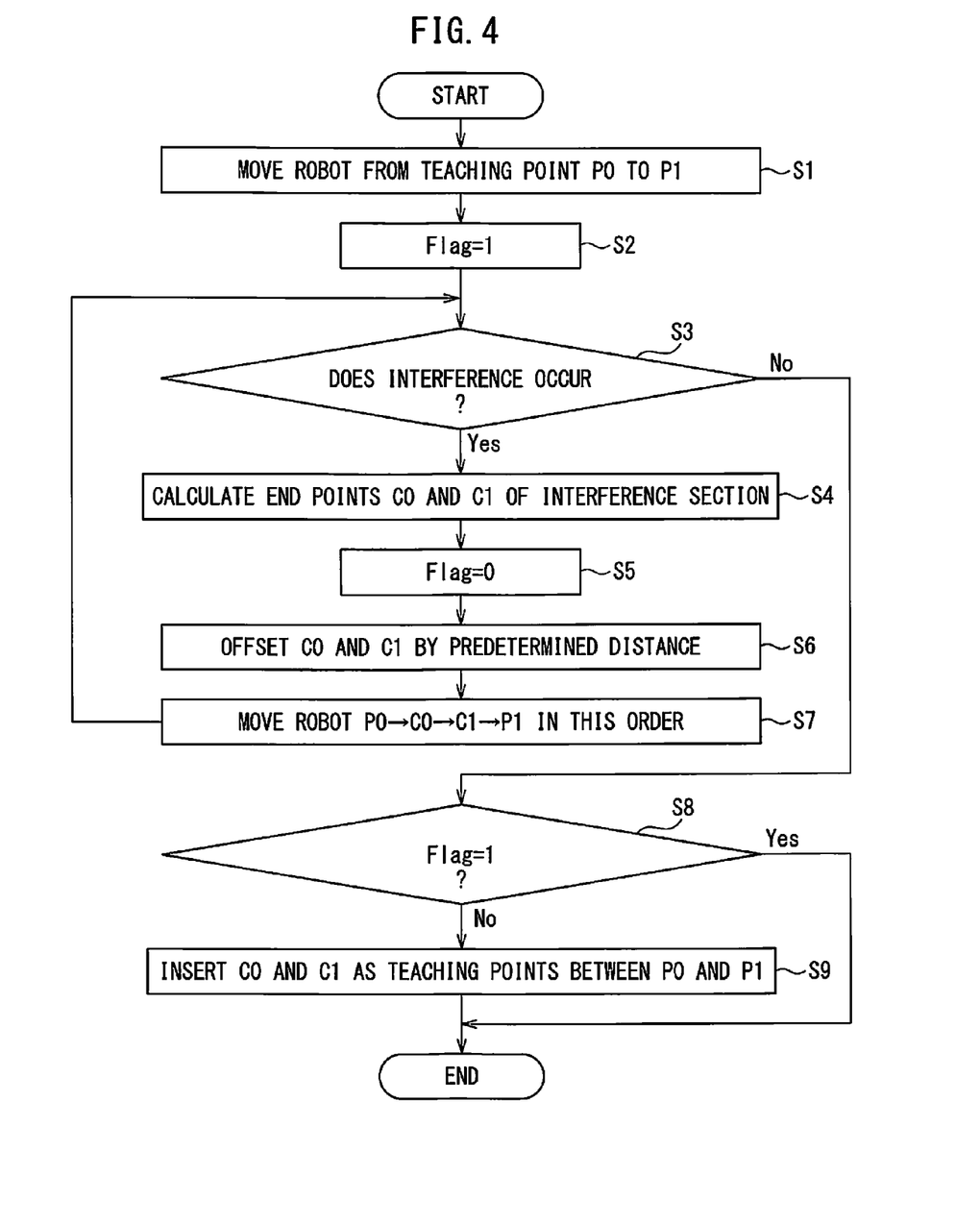
FIG. 4 is a flowchart showing an example of a procedure for moving a trajectory between teaching points in order to avoid interference.
Figure 5:
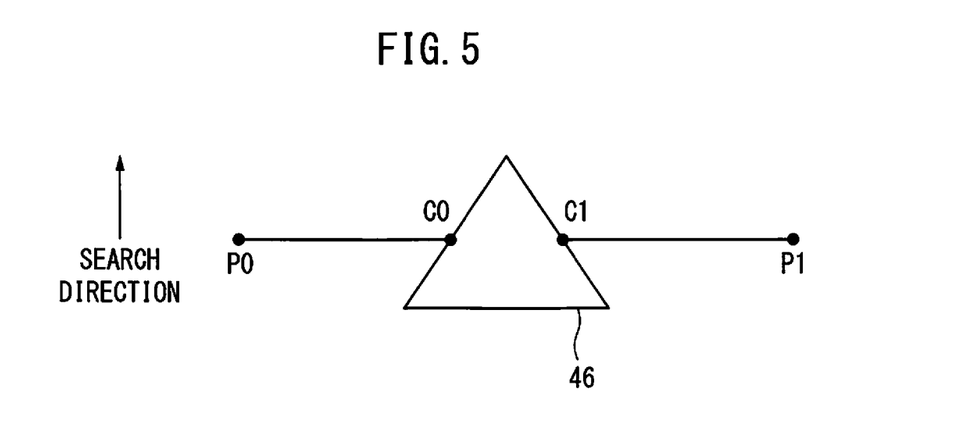
FIG. 5 shows an example of the trajectory between the teaching points before the procedure of FIG. 4 is executed.
Figure 6:
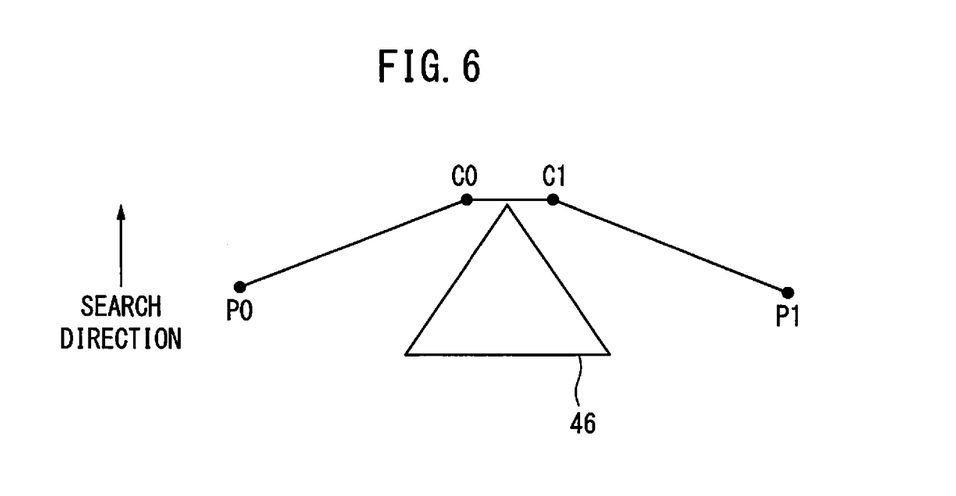
FIG. 6 shows an example of the trajectory between the teaching points after the procedure of FIG. 4 is executed.

FIG. 4 shows a flowchart showing an example of a procedure for automatically correcting the trajectory between the teaching points in order to avoid the interference, and FIGS. 5 and 6 show an example of the trajectory between the teaching points before and after the procedure of FIG. 4 is executed, respectively. In this example, as shown in FIG. 5, the interference does not occur at teaching points P0 and P1, while robot 22 interferes with object 46 on the trajectory between teaching points P0 and P1. Further, teaching points at both ends of the interference section are determined or calculated as teaching points C0 and C1.

First, in step S1, robot 22 is moved from teaching point P0 to P1, and then one (1) is substituted into a flag (step S2). Next, in step S3, it is judged as to whether or not the interference occurs. If the interference occurs, teaching points (C0 and C1) at the both ends of the interference section are calculated (step S4), and then zero (0) is substituted into the flag (step S5).

In the next step S6, teaching points C0 and C1 are moved (or offset) by a predetermined distance by moving the designated search axis along the search direction thereof within the predetermined motion range. Next, in step S7, the robot is moved to teaching points P0→C0→C1→P1 in this order, and then it is judged again as to whether or not the interference occurs (step S3). The procedure from step S3 to S7 is repeated until the interference does not occur.

When it is judged that the interference does not occur, a flag judgment is executed in step S8, and then teaching points C0 and C1 after being moved are inserted between teaching points P0 and P1 (step S9). By virtue of this, a new trajectory for avoiding the interference between the robot and object 46 can be obtained, as shown in FIG. 6.

As explained above, even when the interference occurs on the trajectory between the teaching points to which robot 22 is moved due to the operation by the operator, the trajectory can be automatically corrected so as to avoid the interference, by moving the teaching points at the both ends of the interference section along the predetermined search direction within the predetermined motion range (search range). In the example of table 4, although the motion range of each search axis is determined as ±1000 mm, this range may be determined or modified based on the shape or size of robot 22, machine tool 30 or workpiece 32, etc.

In the above embodiment, the signal for executing the simulation of the motion of the peripheral equipment and the opening/closing motion of the hand is set with respect to each teaching point or each trajectory between the teaching points in the robot operation program, and displaying/hiding the workpiece is switched. In this regard, the robot operation program may be constituted by a plurality of blocks (or a program template) each representing an operation unit, and in this case, the same process can be executed with respect to a teaching point or a trajectory between the teaching points included in the program template.

The robot programming device according to the above embodiment may be substantially integrally incorporated into a controller for controlling an actual robot. Alternatively, the robot programming device may be arranged as another device (such as a personal computer) separated from the controller. In addition, each function of the controller may be realized by a CPU, for example.

According to the present invention, the motion of the peripheral equipment and the displaying/hiding of the workpiece can be executed with respect to each teaching point or each trajectory between the teaching points. Therefore, the interference of the robot can be easily and precisely checked, and the teaching point can be easily corrected.

By setting the condition for avoiding interference to the teaching point or the trajectory between the teaching points as the attribute data, the position for avoiding interference can be automatically detected, and the teaching position can be automatically corrected or inserted, depending on the motion of the peripheral equipment and/or the existence of the workpiece.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot programming device for locating a robot, peripheral equipment and a workpiece in a three-dimensional virtual space, and for teaching the robot, the robot programming device comprising a controller comprising:
    a simulation executing part configured to execute a simulation of a motion of the peripheral equipment and an opening/closing motion of a hand of the robot, by using a control signal;
    a signal setting part configured to set the control signal for executing the simulation of the motion of the peripheral equipment and the opening/closing motion of the hand of the robot,
        with respect to a teaching point or a trajectory between teaching points included in a predetermined robot operation program, or
        with respect to a teaching point or a trajectory between teaching points included in a program template on which the predetermined robot operation program is described,
    wherein the control signal is set as attribute data of each teaching point or each trajectory, and wherein the attribute data include data indicating whether the workpiece is to be displayed or hidden;
    a moving part configured to move the robot to the teaching point or the trajectory between the teaching points; and
    a display setting part configured to automatically determine, based on the attribute data, as to whether the workpiece is displayed or hidden, with respect to the teaching point or the trajectory between the teaching points to which the robot is moved.

2. The robot programming device as set forth in claim 1, wherein the controller further comprises:
    an interference avoidance condition setting part configured to set a motion direction and a motion range of the robot for searching for a position for avoiding interference, the motion direction and the motion range of the robot being set as the attribute data to each teaching point; and
    an interference avoidance teaching point setting part configured to, when interference occurs with respect to the robot moved to the teaching point by the moving part,
        move the robot to a position where the interference is avoided based on the setting of the interference avoidance condition setting part, and then
        automatically set the position where the interference is avoided as a teaching point.

3. The robot programming device as set forth in claim 1, wherein the controller further comprises:
    an interference avoidance condition setting part configured to set a motion direction and a motion range of the robot for searching for a position for avoiding interference, the motion direction and the motion range of the robot being set as the attribute data to each trajectory between the teaching points; and
    an interference avoidance teaching point setting part configured to, when an interference section with respect to the robot exists on the trajectory between the teaching points to which the robot is moved by the moving part,
        move both ends of the interference section based on the setting of the interference avoidance condition setting part, and then
        automatically set positions of the moved ends of the interference section as teaching points.

\* \* \* \* \*